April 2, 1929.  C. T. LITTON  1,707,737
INTERNAL COMBUSTION MOTOR
Filed June 23, 1925   3 Sheets-Sheet 2
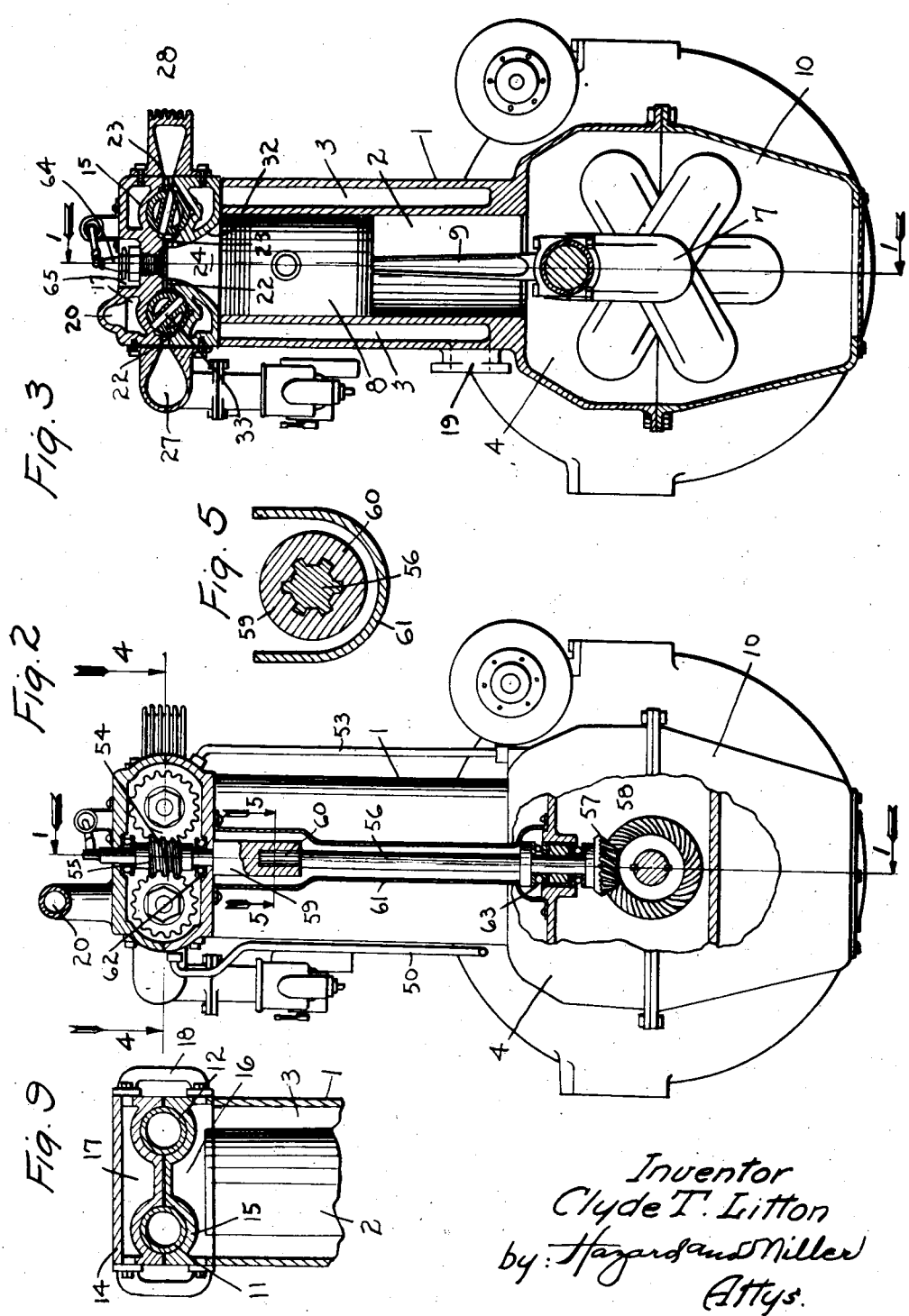
Inventor
Clyde T. Litton
by Hazard and Miller
Attys.

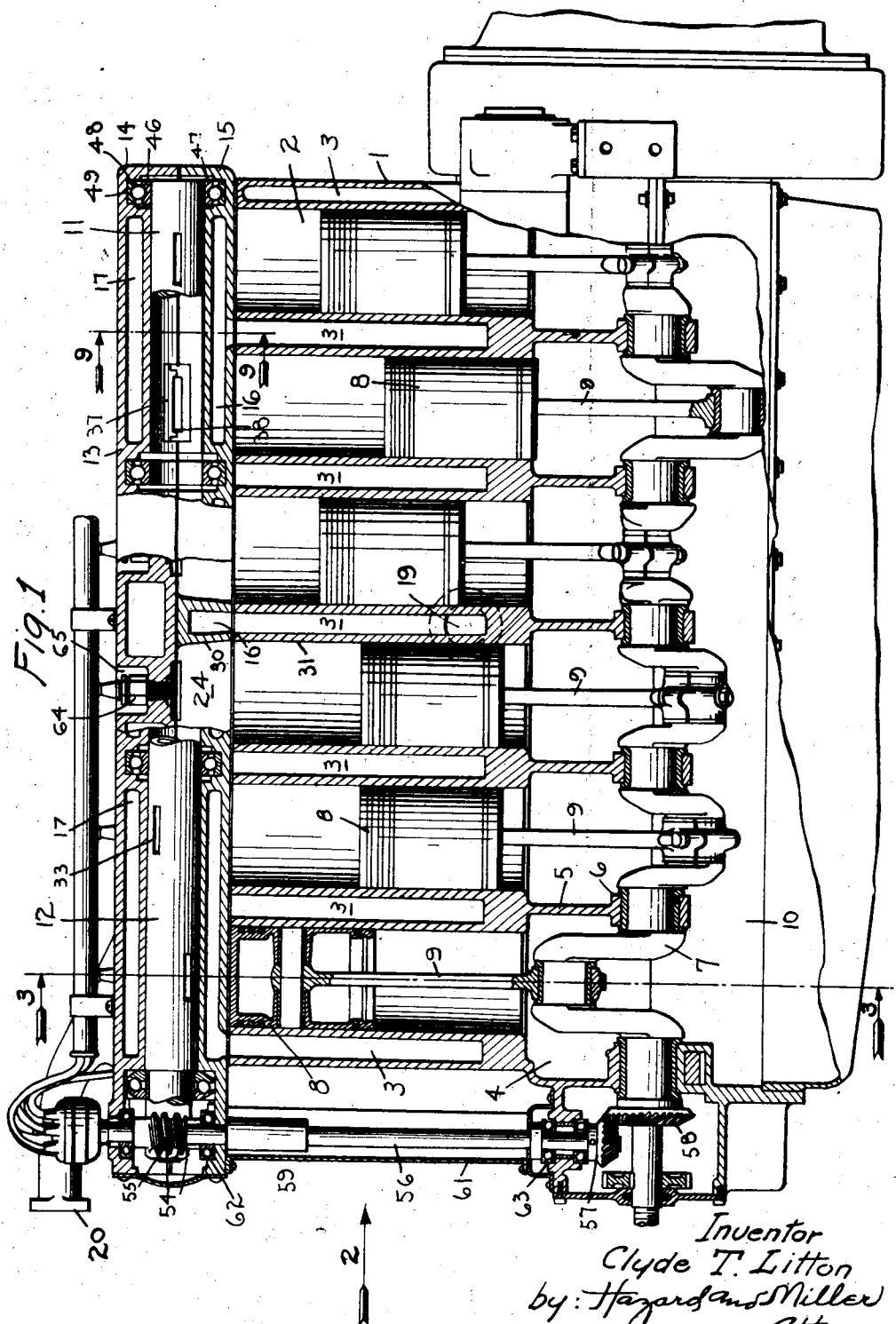

April 2, 1929.  C. T. LITTON  1,707,737
INTERNAL COMBUSTION MOTOR
Filed June 23, 1925  3 Sheets-Sheet 3
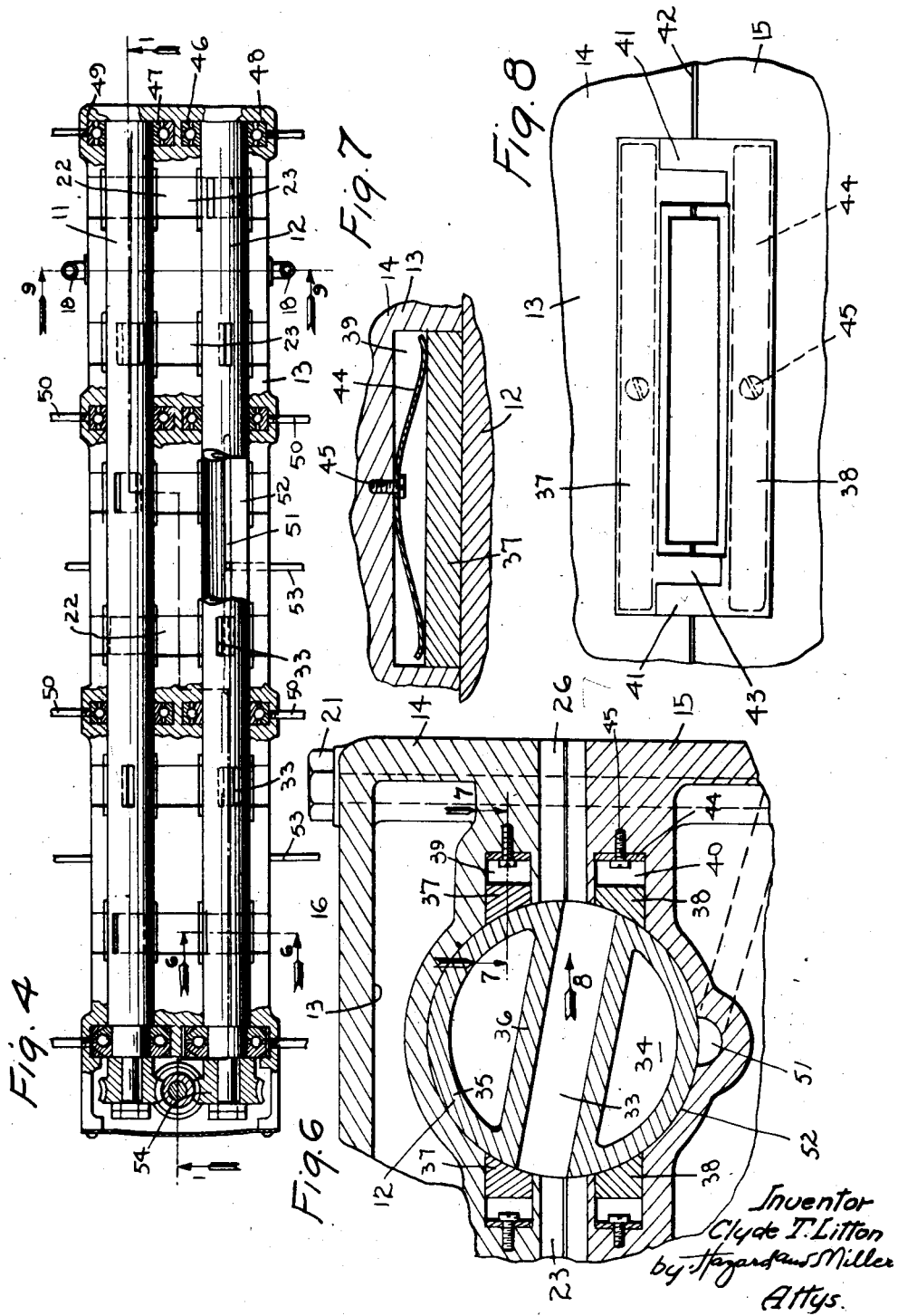

Patented Apr. 2, 1929.

1,707,737

UNITED STATES PATENT OFFICE.

CLYDE T. LITTON, OF INGLEWOOD, CALIFORNIA.

INTERNAL-COMBUSTION MOTOR.

Application filed June 23, 1925. Serial No. 39,033.

My invention is in an internal combustion motor of the rotary overhead valve type and pertains particularly to an engine having rotary intake and exhaust valves situated on opposite sides of the cylinders with substantially only sufficient space therebetween for a spark plug.

Some of the objects of my invention are to apply to a multi-cylinder internal combustion engine, a pair of rotary valve shafts or rotors having a series of passages thereto which function with fixed ports to form inlet and exhaust valves. These rotors with the valve so formed are on opposite sides of a row of cylinders extending therealong and are positioned close together. By this construction the head of each cylinder is substantially parallel sided in the direction alining with the cylinders and crosswise thereto is somewhat coned. The spark plug in each cylinder is inserted in the middle position of the head so formed and is in direct alinement with the fresh gas feed through the intake.

Another object of my invention is the construction of a combustion chamber which has opposite side walls having an internal convex curve on the walls running lengthwise of a set of cylinders. The widest part of these walls is at the side of the cylinder and they contract so that the spark plug is positioned substantially in the axial line of the cylinder, and the intake and exhaust ports are set inward from the outside of the cylinder. Considered in the direction of the line of cylinders, the combustion chamber tapers inwardly and upwardly slightly from the outside diameter of the cylinder. The flow of gas and the products of combustion has an even stream line flow from the ports downwardly on the explosion strokes, and also has a free or stream line flow to the ports outwardly on the exhaust strokes. The gradual curve of the combustion chamber eliminates pockets and unnecessary swirling of the products of combustion.

In the greater detail it may be stated, that my invention comprises a multi-cylinder internal combustion engine with the cylinders alined and having a block casting forming the upper part of the crank case and the cylinders, with water jackets incorporated in the cylinders. The cylinder head consists of two sections, an upper and a lower, and being split in amid position and a pair of valve rotor shafts extend longitudinally of the split head, being positioned partly over or with their axes substantially in the line of the opposite sides of the cylinder walls. Placing the valve rotor shafts so close together forms a partially conical, in a transverse direction, and a partially straight sided cylinder head in the longitudinal direction. The spark plugs are inserted through the upper section of the split cylinder heads and are positioned to form a spark directly in line with the intake through the valve rotors and at the narrow position of the cylinder heads.

My invention also comprehends the details of cooling the cylinders, and the upper and lower sections of the cylinder heads, thereby maintaining the valve rotors at their proper temperature. I also provide lubricating oil piping and oil ducts, leading the oil to the bearings of the valve rotors from which position the oil flows to outlets in the lower section of the head between the various ports.

A further detail is a type of pressure packing strips which extend along the valve rotors, thereby effectively sealing such rotors at the various valve passages therethrough. These packing strips are pressed by bearing springs in the upper and lower cylinder heads, giving a tight seal. The valve rotors are also driven by a vertical shaft geared to the crank shaft and driving the rotors in opposite directions by means of gears on the rotors meshing with a single gear in the vertical shaft.

My invention will be more readily understood from the following description and drawings, in which:—

Figure 1 is a vertical longitudinal section of my engine taken substantially on the lines 1—1 of Figs. 2 or 3, showing part of the split cylinder heads being broken or sectioned to show the exhaust and intake valves and the explosive chamber of the cylinder heads. This view is taken substantially in the direction of the arrows in Figs. 2 and 3, that is from the exhaust side and shows the sections of the cylinder heads on the heavy dotted line 1—1 of Fig. 4, viewed in the direction of the arrows.

Fig. 2 is a front end view of my engine in the direction of the arrow 2 of Fig. 1, showing in partial section the vertical shaft and gearing between the crank shaft and the valve rotors.

Fig. 3 is a vertical cross section of the engine on the line 3—3 of Fig. 1, that is showing a section through the number 1 cylinder.

Fig. 4 is a plan of the valve rotors and the lower half of the split head, showing the valve passages in various positions, the drive mechanism for the valve rotors and the oiling system.

Fig. 5 is a detailed cross section on the line 5—5 of Fig. 2, showing a spline connection between the vertical shaft from the crank shaft and the worm gear shaft for driving the valve rotors.

Fig. 6 is an enlarged section through one of the rotors on the line 6—6 of Fig. 4, showing the valve passage in register with the ports. This figure is illustrated with both the intake and exhaust valves and also shows the packing strips to seal the rotors adjacent the ports.

Fig. 7 is a detailed of the packing strips on the line 7—7 of Fig. 6, showing the spring for forcing said strips into tight engagement with the valve rotors.

Fig. 8 is an elevation of the packing strips in the direction of the arrow 8 of Fig. 6.

Fig. 9 is a vertical cross section of the cylinder head and the upper portion of the cylinders on the line 9—9 of Figs. 1 or 4 illustrating the water circulation from the cylinders to the lower half of the split cylinder head and by external conduits to the upper half of the cylinder head.

The type of engine having my system of rotary valves is shown generally in Figs. 1, 2 and 3, in which a cylinder block casting 1 forms six cylinders 2, in line having a coring 3 for water circulation, the lower portion of the casting forming the upper half 4 of the crank shaft housing. The casting has a number of cross-webs 5 to which are secured journals 6 in the usual manner for the crank shaft 7. These cranks are preferably arranged and connected to the pistons 8 by the usual piston rods 9, usually designated connecting rods, so that the pistons compress the gas and the firing order in the cylinders is number 1, 4, 2, 5, 3, and 6, numbering the cylinders from the forward end of the engine. The lower half of the crank house 10 forming the oil sump is connected to the upper half in the usual manner.

The rotary valves are contained in and operated by a pair of valve rotors 11 and 12, shown particularly in Figs. 2, 3, 4 and 6. These rotors are journaled in and cooperate with the split cylinder head 13, having a lower half 15 and an upper section 14. These sections are cored to form water passages 16 in the lower half leading from the water jackets 3 of the cylinders and a water jacket 17 in the upper half of the cylinder heads connected to the water passages 16 by the external conduits 18 on each side of the engine. The water from the radiator enters the water jacket 3 by the water conduit 19 and leaves by the conduit 20. (See Fig. 1.) The split cylinder head is preferably bolted as a unit to the cylinder block casting 1, however, if desired, the lower half may be first bolted to the cylinder casting and then the upper section secured thereto. The clamping bolts are indicated by the numeral 21 (Fig. 6).

The cylinder head is provided with a series of fixed ports such as the intake ports 22 and the exhaust ports 23, leading into the explosion chamber 24 and also have fixed induction ports 25 and eduction ports 26 leading from the intake manifold 27 to the exhaust manifold 28 respectively. The combustion chamber 24 which is formed in the lower half of the cylinder head has the front and rear side walls 30 in substantial alinement with the cylinder walls 31. The side walls 32 however, are at a considerable angle, thereby forming a somewhat partially cone-shaped explosion chamber. It may be understood that the fixed ports are constructed by forming slight recesses in both the lower and upper part of the cylinder head.

An inspection of Fig. 3 shows the cross sectional shape of the combustion chamber 24 and Fig. 1 illustrates its longitudinal shape. It will be seen that this combustion chamber is materially narrower at its upper part than at the lower part adjacent the cylinders, and that in a transverse direction the walls have a convex curve. The intake and exhaust ports are placed relatively close to the axial line of the cylinder, there being substantially only space for the spark plug between. Hence the intake gas has an even stream line flow into the cylinder and on the explosion stroke the gases expand with the stream line flow, without forming any dead pockets or areas of turbulence. The slightly inclined fore and aft walls 30 of the combustion chamber direct the products of combustion downwardly and on the exhaust stroke the gases are forced out in a stream line direction so that there are no dead pockets leaving burnt gas.

The valve rotors 11 and 12 are cylindrical and of the same diameter from end to end, and have a series of transverse passages or ports 33 extending diametrically across the rotors and forimng either intake or exhaust valves in accordance with which rotor they are in. The rotors are cored as indicated at 34, leaving a substantially hollow center with the peripheral portions 35 and the cross walls 36 forming valve passages. It will thus be seen that the rotors are comparatively light and therefore easily operated and cooled.

A gas seal both for the intake and exhaust gases is formed by packing strips 37 and 38 which are illustrated particularly in Figs. 6, 7 and 8. These packing strips are inserted in recesses 39 and 40 formed on the upper and the lower half of the split cylinder head respectively. The strip 38 is shown with a tongue 41 on each end, extending across the adjoining surface 42 of the lower and upper halves of the split cylinder head, and tongues 43 on each end of the strip 37 likewise extend downwardly overlapping with the tongues 41. A spring 44 is mounted in each of the recesses 39 and preferably secured therein by a screw 45. These springs are tensioned to press the packing strips 37 and 38 into tight engagement with the valve rotors 11 and 12, surrounding the intake and exhaust ports 22 and 23.

The rotors are preferably journalled by a series of ball bearings 46 which have a ball race 47 fixed to the rotors and an outer ball race 48 held in recesses by annular grooves 49 in the upper and lower halves of the cylinder head. Inlet oil ducts 50 feed oil under compression to the ball bearings above described and a series of grooves 51 in the lower bearing surface 52 of the bottom half of the cylinder head conduct the oil to the outlet ducts 53. It will be understood that the oil may be fed to the inlet 50 and carried from the outlets 53 in any suitable manner. The system preferably used being of a forced or pressure oiling system connected with the sump or crank case.

The valve rotors are rotated in the proper time by the following mechanism:—

A worm wheel or skew gear 54 is secured in any suitable manner, preferably to the forward end of each of the rotors, and meshes with a worm 55 driven by the vertical shaft 56, by a bevel gear 57 meshing with a gear 58 on the forward portion of the crank shaft. The worm or skew gear is shown formed on a stub shaft 59 which is connected by the splines 60 as shown in Fig. 5 with the shaft 56. A casing 61 is shown enclosing the vertical shaft and part of the stub shaft. These shafts are supported by suitable anti-friction bearings 62 and 63, the latter bearings functioning as cross bearings to prevent any up and down motion of the shaft.

The assembly and operation of my engine it is believed will be obvious from the above description. It is to be noted that the water circulation system enters at the lower portion of the cylinder water jackets and may flow in at either one or more water inlet openings. The water flows upwardly, circulates through the lower section or half of the cylinder head by direct and open connections, using water-tight gaskets between the lower section of the cylinder head and the cylinder casting. The water is conducted from the lower to the upper half of the cylinder head by the external conduits 18 and thence through the upper section and back to the radiator.

The oiling of the cylinders and pistons is not particularly specified herein and may be of any suitable character. The lubrication of the valve rotors is by means of a forced feed system forcing the oil in under pressure at the anti-friction bearings, such oil following along the rotor and being let out by the grooves 51 and the outlet pipes connected thereto.

The fuel explosions are caused in the usual way by means of the spark plugs 64 inserted through a recess 65 in the upper cylinder head section and explode the fuel in the explosion chamber 24. It will be noted that the spark plug is directly in line with the gas intake.

The valve rotors have the transverse passages 33 which may be designated the valves, positioned relative to each other in each of the rotors, so that the rotation of the valve rotors in opposite directions as indicated by the arrows in Figs. 2 and 3, will bring the valves or passages into alinement with the inlet and induction ports 22 and 25 and with the exhaust ports 23, and the eduction ports 26 at the proper time in regard to each cylinder.

In Fig. 3, it shows the piston of No. 1 cylinder in its upper position and illustrates the exhaust valve in the exhaust rotor as closing, the gas being substantially completely exhausted from the cylinder and the piston about to start on the intake stroke. I find it preferable to position the center line of the ports in the intake and exhaust rotors shifting one eighth of a circle in reference to each other. Hence, the crank will turn one eighth of a circle after the exhaust valve has been wide open or its central position horizontal and in direct line with the exhaust and eduction ports before the intake valve occupies a position with its central line in the horizontal position and in direct line with the inlet and induction ports.

Two complete revolutions of the crank shaft are necessary to turn the valve rotors through one half of a revolution, that is until the gas enters and exhausts through each valve in the reverse direction. The valves in the rotors for the remaining cylinders will be located in proper position in reference to those of cylinder No. 1, in accordance with the firing order.

It will be understood that the moment of cut-off of the exhaust and opening of the intake port may be adjusted by the setting of the rotors in order to change the timing of the strokes of the motor. Substantially the same principles apply to changing the time of my rotary valve engine as is well understood in connection with poppet valve engines.

The relative positions of the valves or passages through both the inlet and exhaust rotors is illustrated in Figs. 1 and 4 for all the different cylinders, to cause a firing order of numbers 1, 4, 2, 5, 3 and 6 cylinders, numbering from the front.

It will be manifest that the firing order may be changed by substituting different rotors and cranks and by rearranging the distribution box which is indicated mounted on the upper end of the shaft 56.

My invention may be considerably modified as to the details of the rotors, the shape of the valve or openings therethrough and the position of the inlet and exhaust ports. It is to be noted that the valves and ports are elongated in an axial direction and as soon in a circumferential direction.

It will be noted that in my invention there are a series of anti-friction bearings positioned lengthwise of each of the valve rotors and that an intake oil pipe feeds oil to these bearings. The oil then spreads lengthwise of the rotors and is discharged through the discharge oil ducts 53 leading from the grooves 51 in the lower part of the cylinder heads. This system of feeding forms a film of oil on the rotors and at the ports the packing strips 37 and 38 with the tongues 41 and 43 function to scrape a certain amount of this oil off the rotors, preventing it being carried into the engine with the intake or blown out with the exhaust.

Another characteristic feature of my invention as applied to a 6 cylinder motor is that the cranks are evenly distributed around the crank shaft, these being one sixth of a circle apart as clearly shown in Fig. 3. This arrangement gives an evenly balanced crank shaft and with the setting of the intake and exhaust passages through the valve rotors allows the various explosion strokes to be distributed along the crank shaft, reducing or eliminating the whipping action when explosions of adjacent cylinders occur consecutively. It will be noted in my engine that the firing order is cylinders 1, 4, 2, 5, 3, 6. Thus giving an even distribution of the power strokes.

Having described my invention, what I claim is:

1. In an internal combustion engine having a plurality of cylinders in alinement, a cylinder head in separate lower and upper parts, having ports at their adjoining faces, a pair of valve rotors having inlet and exhaust ports, a series of anti-friction bearings spaced longitudinally of the rotors and forming journals therefor, oil ducts leading to said bearings, packing strips fitting in the upper and lower parts of the head at the ports and surrounding said ports, and discharge oil ducts in the lower cylinder heads positioned between the bearings.

2. In an internal combustion engine having a cylinder head with separate lower and upper parts with ports at their adjoining faces, a valve rotor having ports mounted in the head transverse to the axis of the cylinder, there being longitudinal grooves or recesses in the upper and lower head parts adjacent the ports and longitudinally of the rotor, and circumferential grooves or recesses in the heads crossing the adjoining faces and adjacent the ports, a packing strip in each of the longitudinal grooves or recesses having tongues at each end fitting in the circumferential grooves or recesses, the said tongues of each strip overlapping.

3. In an internal combustion engine having a plurality of cylinders in alinement, a cylinder head in upper and lower sections, a rotary valve in said sections, the junction faces of the sections having ports on opposite sides of the valve, some of the ports leading to the cylinders, the other ports leading to a manifold, a series of anti-friction bearings spaced longitudinally of the rotary valve, a series of packing strips resiliently mounted in recesses in the upper and lower sections of the head, said packing strips extending longitudinally of the valve and each having a pair of end tongues extending partially around the periphery across the ports, the valve bearing against the packing strips, means to feed oil to the anti-friction bearings and an outlet for oil in the lower head section between the bearings.

4. In an internal combustion engine having a plurality of cylinders and a cylinder head formed in upper and lower sections, the lower cylinder heads having combustion chambers, a pair of rotary valves extending longitudinally of the cylinder head on opposite sides of the cylinders, ports at the junction faces of the cylinder heads leading to the combustion chamber and to manifolds, a series of packing strips resiliently mounted in recesses in the upper and lower cylinder heads, said packing strips extending longitudinally of the valves and each having a pair of tongues extending partly around the periphery of the valves and overlapping across the junction point of the head sections, a series of anti-friction bearings positioned longitudinally of the valves, one of said bearings being a thrust bearing, means to feed oil to said bearings and a series of outlets for oil in the lower head section between the bearings.

In testimony whereof I have signed my name to this specification.

CLYDE T. LITTON.